Figure 3:
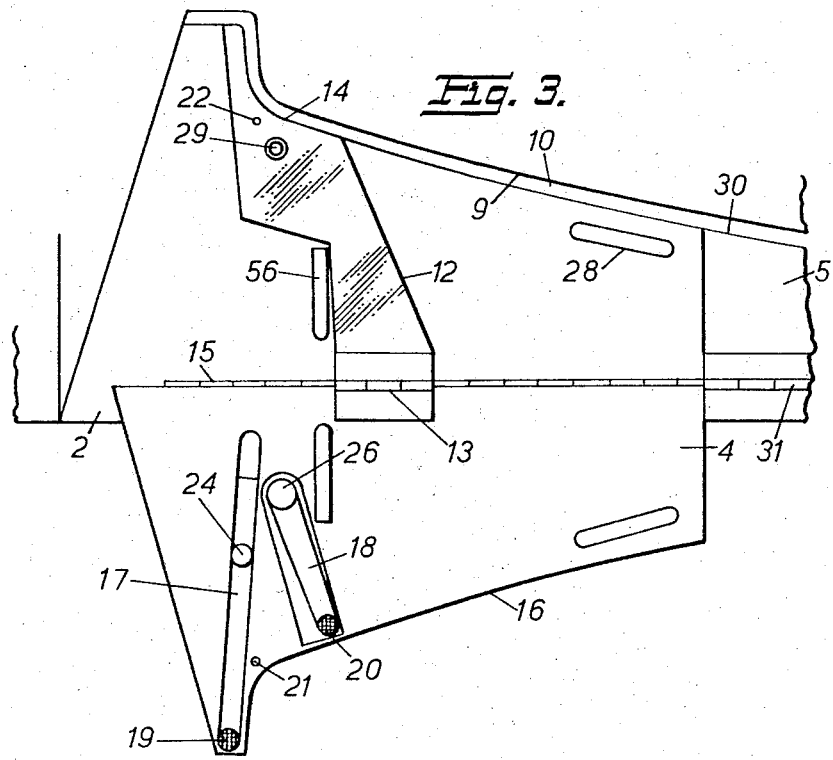

April 25, 1967    M. N. BENNISON    3,315,625
METHOD AND APPARATUS FOR STITCHING MATERIALS
Filed March 5, 1965    2 Sheets-Sheet 1
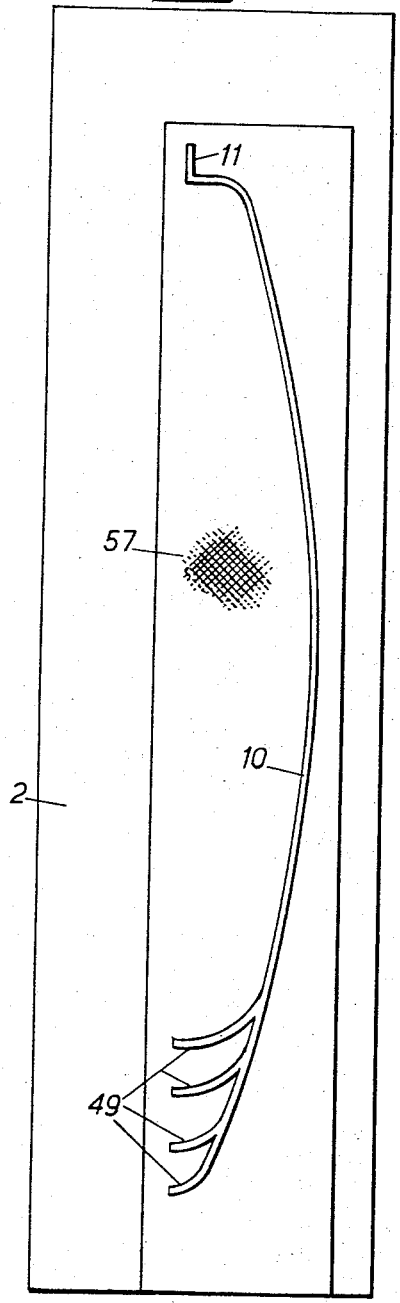
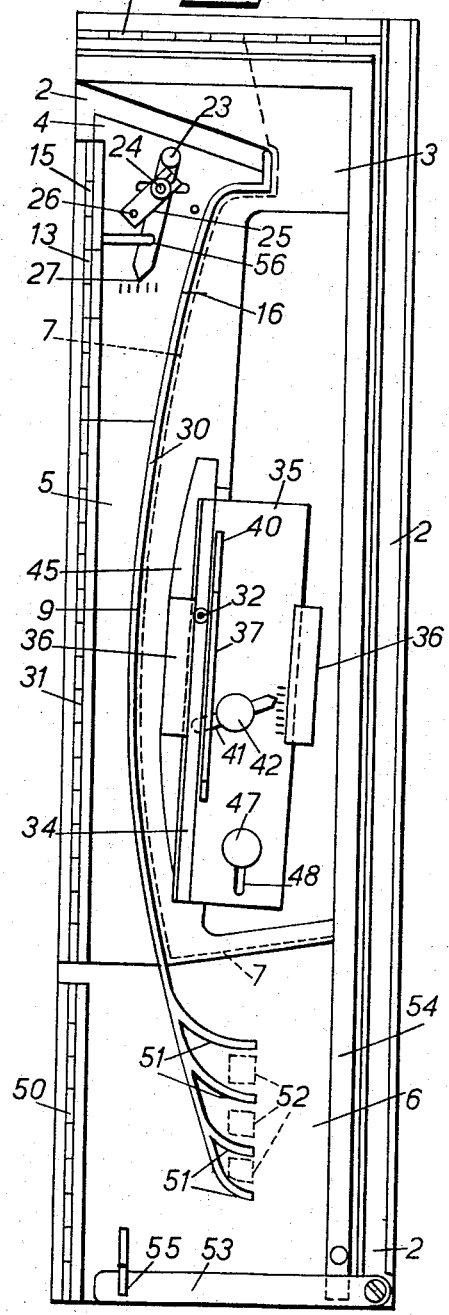

April 25, 1967   M. N. BENNISON   3,315,625
METHOD AND APPARATUS FOR STITCHING MATERIALS
Filed March 5, 1965   2 Sheets-Sheet 2

United States Patent Office 3,315,625
Patented Apr. 25, 1967

3,315,625
METHOD AND APPARATUS FOR STITCHING MATERIALS
Michael N. Bennison, Bardsey, Leeds, England, assignor to W. J. Clarkson Limited, Leeds, England, a British company
Filed Mar. 5, 1965, Ser. No. 437,479
Claims priority, application Great Britain, Mar. 12, 1964, 10,487/64; Sept. 15, 1964, 37,600/64
12 Claims. (Cl. 112—262)

This invention relates to methods of, and means for, facilitating the stitching of materials together by a sewing machine in a predetermined manner.

In the manufacture of some articles, particularly articles of clothing, certain operations involve the stitching together of at least two layers of material in a particular manner described in the clothing trade as under-basting. In many instances it is necessary, or desirable, to provide fullness or ease (i.e., a slightly greater area) of material in at least one layer of combined layers. This is particularly so in articles of clothing.

The main object of the present invention is to provide at least one further method of, and means for, producing fullness in at least one layer or combined layers of material.

Accordingly there is provided a method of providing fullness in at least one layer of superposed layers of material, consisting in creating a substantially ripple-like formation in said layer in a manner to produce fullness and stitching the layers together across the ripples to join them together and retain the fullness.

The present invention includes a method of providing fullness or so-called ease for the stitching of layers of material together, consisting in locating superposed layers of material on one of the plates of a template with an interposed plate, closing another plate of the template on to the upper layer of material and causing said layer to be engaged by spaced apart gripping means, and causing relative movement between said gripping means to create a substantially ripple-like formation in said layer to give it fullness or ease and then stitching the layers together.

The invention may include gripping the material with resilient pressure and then moving the material in relation to a retained point or area. The method includes the step of clamping the layers of material firmly in the template after fullness adjustment has taken place.

The invention includes means for clamping superposed layers of material and providing fullness in at least one layer, said means including plates between which the layers of material can be inserted and at least two gripping devices arranged in spaced apart relationship with means for moving at least one such device in relation to the other to produce a ripple-like effect and thus fullness in the gripped layer. The gripping devices may be independently spring loaded. The gripping devices may be mounted for common positional adjustment in linear relation to a layer of material.

Figure 4:
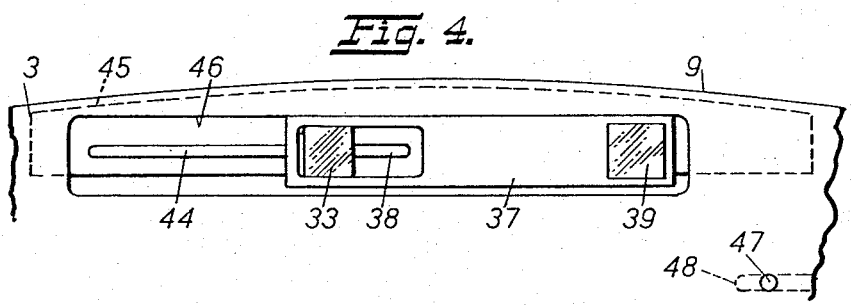
Figure 5:
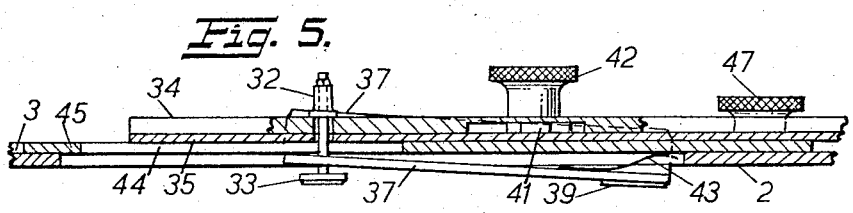

The invention will now be more fully described with reference to the accompanying drawings in which:

FIG. 1 is a plan view from above of an improved template for the under-basting of jacket facings;
FIG. 2 is a plan view from below, of the template;
FIG. 3 is a detail plan view of a garment facing corner forming part of the clamping template with the upper plate turned to an open position;
FIG. 4 is a plan view from below of the upper plate of the centre part of the template; and
FIG. 5 is a sectional elevation of FIG. 4.

A template is provided including a main base plate 2 with a sectional top plate 3, 4, 5 and 6, hinged thereto and with an interposed plate 7 to lie between layers of material located in the template. The main section 3 of the top plate is hinged at 8 to one end of the base plate 2 with its front edge 9 profiled to be complementary to a guide track slot 10 in the base plate. The aforesaid interposed plate 7 is also hinged into the hinge 8 at one end to the base plate and has its front edge profiled to be complementary also to the guide track slot. This slot at one end 11 is L-shaped for the formation of a jacket lapel corner and the interposed plate 7 and top plate 3 are shaped to the slot inned edge. At this corner a separate interposed plate 12 is hinged at 13 to the base plate to lie thereover with a profiled edge 14 complementary to and in register with the other edge of the guide track slot. A second top plate section 4 is also hinged at 15 to the base plate 2 to lie over this second interposed plate 12 and base plate and with its inner edge 16 profiled complementary to and in register with the outer edge of the guide track slot. This lapel corner top plate 4 is furnished with two gripping elements 17, 18, on its underside lying in recesses and one element 17 is capable of a sliding movement longitudinally and the other element 18 a pivotal movement. The gripping ends 19, 20, of these elements can be serrated or otherwise furnished with gripping faces and they are adapted to be movable in relation to one another and a given point adjacent the corner of the lapel where a spike 21 is provided on the inner face of this upper plate 4 to press into material and hold it externally of the guide track slot 10. A hole 22 is formed in the plate 12, and one in the base plate 2, to accommodate the spike. The slidable element 17 has a pointed operating lever 23 pivotally mounted on top of the corner plate 4 and connected thereto by a pin 24. This connection engages the slotted end of a pivoted lever 25 which moves the pivotal gripping element about a common axis, 26. The point 27 of the said operating lever 23 can be movable in relation to setting graduations. These two gripping elements 17 and 18 are provided to give fullness to the upper layer of material in the template at the corner of a lapel. The base plate 2 (and/or the interposed plate 12 for the corner) is furnished with stop means 28 and 29 (or indication means) for the positioning of layers of material in the template. A third top plate section 5 is provided to form a continuation of this corner top plate with its inner edge 30 in profiled register with the guide track slot and hinged at 31 to the base plate 2.

To provide fullness or ease down the jacket facing over a required region intermediate the corner of the lapel and the bottom of the facing the aforesaid main top plate section 3 is provided with material gripping means. Such means comprise a coil spring loaded plunger 32 provided with a foot 33 having a gripping underface to engage the upper layer of material at a point of this region nearest the lapel corner. This plunger is carried by the stiffening bar 34 of an adjustable plate 35 which is slidably mounted in guides 36 on top of the said main top plate 3 to be movable, for positioning, longitudinally of the plate 3 adjacent its profiled front edge.

A further spring loaded gripping device 37 is provided which comprises an L-shaped section plate having one flange beneath the main section plate 3 and slotted at 38 at one end for the passage of the aforesaid plunger 32 and furnished at its other end with a gripping surface 39. This device is longitudinally slidable by means of slot 38 so that its gripping surface 39 is movable in relation to the first surface 33. For guidance the upstanding flange of this device 37 is workable in a slot 40 in the adjustable top plate 35 and it can be adjusted by means of a pivoted lever 41 having one end entered into a slot in the said flange and with its other end acting as a pointer in relation to setting graduations. The lever has a knob 42 for operational purposes.

This second device 37 has a leaf spring 43 arranged to press down the gripping surface 39 end of the device which can rock about the plunger 32 as the top plate is closed. As the two devices 33 and 37 are carried by a movable plate 35 the plunger 32 passes through a slot 44 in a guide 45 fixed on the top plate 3, and exposed through an opening 46 in said plate which accommodates the device 37. This movable plate 35 has a locking screw 47 working through a slot 48 therein to secure the plate after the gripping devices 33, 39 have been positioned longitudinally.

The bottom end of the guide track slot 10 in the base plate 2 can terminate in a single curve or, as shown, there can be a number of curves 49 in spaced relationship to suit varying sizes of jacket facings. The upper fourth section plate 6 is hinged at 50 to the base plate 2 and has complementary slots 51 in register with the slots 49. Gripping surfaces 52 are provided on the underface of the plate 6.

Clamping means are furnished for the template and these comprise a pivoted bar 53 on the base plate 2 at the opposite end to the hinges for the top plate 3. This bar passes over the end of a reinforcing angle section bar 54 secured down the rear edge of the top plate 3 to pass near or over the rear edge of the fourth section plate 6. The bar 53 can be swung to pass under a fixed catch 55 on the base plate 2 which passes up through a slot in the fourth section top plate 6 which will be further held down by the pivoted bar. The second section top plate 4 is clamped down by the aforesaid pointed operating lever 27 being passed under a fixed catch 56 on the base plate 2 which passes up through a slot in said top plate 4.

With the above arrangement layers of material can be located in the template when it is open and the plates 7 and 12 interposed in the layers. The plate 3 is then closed and thus the gripping surfaces 33 and 39 will press down resiliently on to the top layer of material. The knob 42 can be turned and this will cause relative movement between these two gripping surfaces and thus ripples in the upper layer of material. The plate 3 can then be clamped to secure the material under this plate and plate 6 and plate 5 turned over to a closed position. Plate 4 can then be closed (it could be closed first) and thus the two angled gripping members 17, 18, will press on to the projecting edge of the upper layer of material of the layers lying in the template and when operated by their lever 27 will move this upper layer in two directions over the interleaving plate 12 towards the common point, where the material is restrained by the spike 21, near the template corner to gather the material into a smaller area at the corner and thus give a ripple-like effect in two directions to the material lying within the corner of the template.

With the template secured stitching can take place through the slots formed by the upper sectional plate and base plate 2 around the profile of the template upper plate. The stitching secures the rippled upper layer to any lower layer or layers and thus the ripples produced in the cloth will have produced the necessary fullness in the corner and intermediate part of the jacket facing.

To facilitate movement of the template on a sewing machine, the underface of the base plate 2 is provided with a gripping surface 57 to be engaged by the feed means of the sewing machine.

The improved template may also include means for enabling the length and edge contour of the jacket facing to be variable at the bottom of the facing. For example, a flexible profile element may be provided instead of a fixed contour for the upper plate and thus the flexible element can be readily manipulated into a required shape to give variable formation and length of facing. Means are furnished for securing the flexible element when adjusted to the right contour. As the template is primarily intended to be used on a sewing machine whose feed means will operate on the bottom face of the template, adjustable means will also be required to be moved separately or in unison with a flexible element to provide an underface for the gripping means to engage. When the upper flexible element has the underface associated therewith it can be carried by means spaced from the upper element or its carrier means sufficiently to enable material to be located between the two. With an adjustable arrangement of this nature openings will be required to be left in the upper and lower template plates to accommodate the movable parts.

What I claim is:

1. Method of providing fullness in at least one layer of superposed layers for the stitching of the layers together, consisting in locating layers of material in a template with at least one interposed plate between the layers, grasping said one layer at two spaced locations and while so grasped creating at least one substantially ripple-like formation in said layer of material by shortening the distance between the grasping locations whereby to provide fullness in said one layer in the area between said grasping locations and then stitching the layers together across the ripples to join them together and retain the fullness, said stitching being caused to follow a predetermined path.

2. Method according to claim 1, consisting in causing spaced apart gripping means to engage the layer of material to be rippled and causing relative movement between said gripping means to create a substantially ripple-like formation in said layer.

3. Method according to claim 1, including the step of gripping the material with resilient pressure and then moving the material in relation to a retained region.

4. Method according to claim 1, including the step of applying gripping pressure to a layer of material and sliding it over a smooth surface in relation to another gripped part of the material.

5. Method according to claim 1, including gripping the material in narrow areas and moving the gripped areas in angular relationship to one another to create fullness at a corner formation of the material.

6. Method according to claim 1, including gripping the material at two spaced apart areas of its edges which lie outside the stitching line to be made, also securing said edge of material by piercing it at a point between the gripped areas, and then adjusting the gripped areas in angular relationship and in relation to said point to create fullness by a ripple-like effect in the material.

7. Method according to claim 1, including gripping two spaced apart areas of a layer of material which lie within a stitching line to be made by applying resilient pressure automatically to the layer of material when being clamped in a template, adjusting one of said gripped areas in a straight line in relation to the other area, and then clamping the material securely ready for the stitching operation to take place.

8. Apparatus for clamping superposed layers of material and providing fullness in at least one layer, said means including top and bottom clamping plates between which the layers of material can be inserted, at least one interleaving plate interposed between the top plate and bottom plate of the template to be located between layers of material, at least two material gripping devices, arranged in spaced apart relationship and carried by the top plate to engage the upper layer of material when said top plate is closed down on to superposed layers of material in the template, means for moving at least one such device in relation to the other device to produce a ripple-like effect and thus fullness in the gripped layer of material, and guide track slots through the top and bottom plates for controlling the template in relation to the stitching means.

9. Apparatus according to claim 8, including two gripping devices arranged in angular relationship, one said device comprising a slidable lever and the other device a pivoted lever, and a pivoted operating lever for adjusting the two devices simultaneously in relation to one another.

10. Apparatus according to claim 8, wherein said two devices comprise levers for gripping the material with a piercing spike secured between their material gripping ends, an interleaving plate hinged to the bottom plate of the template to lie flat on the inner face of the bottom plate, said two levers for gripping the material being located in recesses in the inner face of the template top plate and being respectively slidable and pivotal, said top plate being hinged to the bottom plate to be closable down over said interleaving plate and the base plate.

11. Apparatus according to claim 8, wherein two material gripping devices are mounted on the inside of the top plate of the template, said two devices being independently spring loaded, one said device being mounted to be movable in a straight line towards the other device, and operating means externally of said top plate for adjusting said device.

12. Apparatus according to claim 11, wherein the two gripping devices are supported by common mounting means, said mounting means being located in guides to be capable of slidable adjustment on the template top plate, said adjustment being for giving common positional adjustment to the gripping devices in linear relation to a layer of material in the template, and means for locking said mounting means in an adjusted position.

References Cited by the Examiner
UNITED STATES PATENTS

| | | | |
|---|---|---|---|
| 2,811,121 | 10/1957 | Bihaly | 112—2 |
| 2,826,158 | 3/1958 | Phillip | 112—2 |
| 3,034,458 | 5/1962 | Bennison | 112—2 |
| 3,145,392 | 8/1964 | Lockwood et al. | 2—143 |
| 3,174,447 | 3/1965 | Bono | 112—2 |

JORDAN FRANKLIN, *Primary Examiner.*

J. R. BOLER, *Examiner.*